June 24, 1930. F. A. SCRUGGS Re. 17,711

MOLDING MACHINE

Original Filed Dec. 20, 1923 5 Sheets-Sheet 1

INVENTOR.
Frank A. Scruggs.
BY
Munn & Co
ATTORNEYS.

June 24, 1930. F. A. SCRUGGS Re. 17,711

MOLDING MACHINE

Original Filed Dec. 20, 1923 5 Sheets-Sheet 2

INVENTOR.
Frank A. Scruggs.
BY Munn & Co
ATTORNEYS.

June 24, 1930. F. A. SCRUGGS Re. 17,711

MOLDING MACHINE

Original Filed Dec. 20, 1923 5 Sheets-Sheet 3

INVENTOR.
Frank A. Scruggs.
BY
Munn & Co
ATTORNEYS.

June 24, 1930. F. A. SCRUGGS Re. 17,711

MOLDING MACHINE

Original Filed Dec. 20, 1923 5 Sheets-Sheet 4

INVENTOR.
Frank A. Scruggs.
BY Munn & Co
ATTORNEY.

June 24, 1930. F. A. SCRUGGS Re. 17,711

MOLDING MACHINE

Original Filed Dec. 20, 1923 5 Sheets-Sheet 5

INVENTOR.
Frank A. Scruggs.
BY
Munn & Co
ATTORNEYS.

Reissued June 24, 1930

Re. 17,711

UNITED STATES PATENT OFFICE

FRANK ANDERSON SCRUGGS, OF LOS ANGELES, CALIFORNIA

MOLDING MACHINE

Original No. 1,674,229, dated June 19, 1928, Serial No. 681,813, filed December 20, 1923. Application for reissue filed July 25, 1929. Serial No. 381,058.

This invention relates to dough molding machines for molding dough into roll or loaf form and has for its primary object the provision of a machine of this character having novel means which gives to the machine wide latitude of adjustment so that the dough can be shaped to provide rolls or loaves of such commercial or well known styles as respectively characterize French and Vienna bread. French rolls, finger rolls, etc., and which, through this wide latitude of adjustment and the interchangeability of parts of the machine, will enable one to mold dough into practically all shapes that are required in the art of commercial baking. My machine is so designed and constructed whereby dough can be molded into a mass or bulk of the same thickness throughout, blunt at its ends, such as pan bread, rye bread, etc., and of a predetermined length.

A further object of the invention is to provide a machine wherein satisfactory provision is made for shaping and oiling the dough and for flattening and oiling same either on one or both sides, such as practiced in making what are known as Parker-house rolls, napkin rolls, fancy breads and various kinds of coffee goods and French pastries.

A further object of the invention is to provide a machine of this character for oiling, spicing and rolling dough in making cinnamon rolls, coffee rolls, French pastries, etc.

A still further object of the invention is to provide a machine which can be quickly adjusted or set for forming rolls or loaves into respectively different lengths and whose ends can be pointed to suit varying requirements.

A still further object of the invention is to provide a machine of this character having means whereby flour or oil can be distributed to the dough at the proper time and place and which said means is adjustable to allow the operator to use the exact amount of oil or flour he desires.

Another object of the invention is to provide a machine having a novel form of belt formed of one piece of material and arranged to co-act with a set of mold boards in such manner as induce and maintain uniform pressure against the dough and for rolling the dough into a tight mass.

Another object of the invention is to provide a positively acting mechanism for coiling a batch of dough and for progressively increasing the compacting effect of the mechanism against the dough as the latter moves continuously through the mechanism.

A further object of the invention is to provide a dough handling and forming or shaping machine which includes superposed mold surfaces which are relatively adjustable and associated with a dough carrier or conveyor so that and according to the amount of pressure brought to bear against the dough through adjustments of said surfaces, the dough will be molded to assume its intended shape through effective contact with the upper one of said surfaces.

Another object of the invention is to provide a machine of this character embodying a plurality of mold surfaces, wherein one of said surfaces is formed of sections that are independently adjustable with respect to the other of said surfaces so that varying degrees of pressure will be applied to the dough at respectively different points upon said other surface, and further whereby adjustment of one of said sections can be made with relation to flattening roll to cause the dough to be flattened to the desired thickness.

Another object of the invention is to provide a novel coiling mechanism which acts upon a previously flattened strip or mass of dough to roll or coil the strip upon itself and solidify said mass before subjecting same to the action of the molding or shaping surfaces.

Another object of the invention is to provide a machine of this character wherein the dough flattening rolls are associated with scraping means that will keep the rolls free from dough at all times and permit the intended mass of dough to work past the rolls without interference.

A further object of the invention is to provide a machine having dough flattening means consisting of rolls which act to pull a batch of dough therebetween to induce such pressure against the dough as will evacuate the gas therefrom and uniformly flatten the dough and deposit same upon a traveling belt or carrier.

My invention, therefore, comprises certain new features of construction and arrangement and combination of elements hereinafter set forth and pointed out in the claims annexed hereto.

In the drawings wherein the preferred form of my invention is illustrated:

In carrying the invention into practice, I employ a suitable base frame, table or similar structure 20, which rises to a height where the various working parts of the machine will be disposed in convenient reach of the operators.

Figure 1:
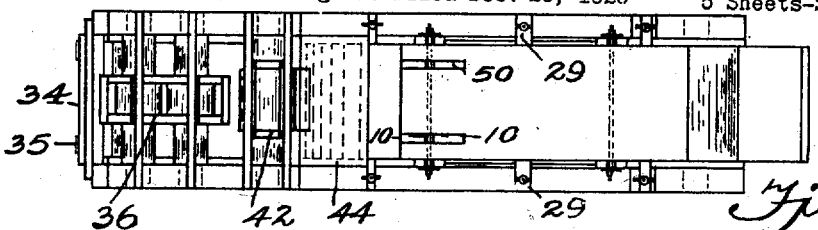
Figure 1 is a top plan view of the machine.
Figure 2:
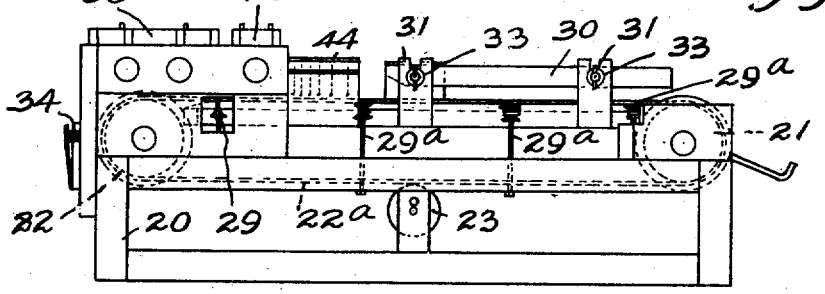
Figure 2 is a view in side elevation thereof.
Figure 3:
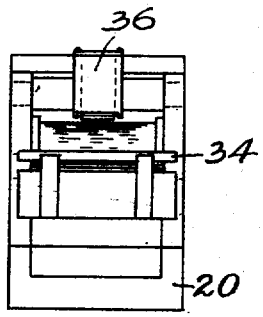
Figure 3 is a rear end elevation thereof.
Figure 4:
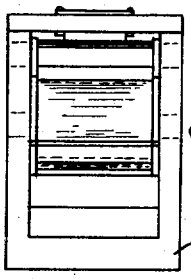
Figure 4 is a front end view.
Figure 5:
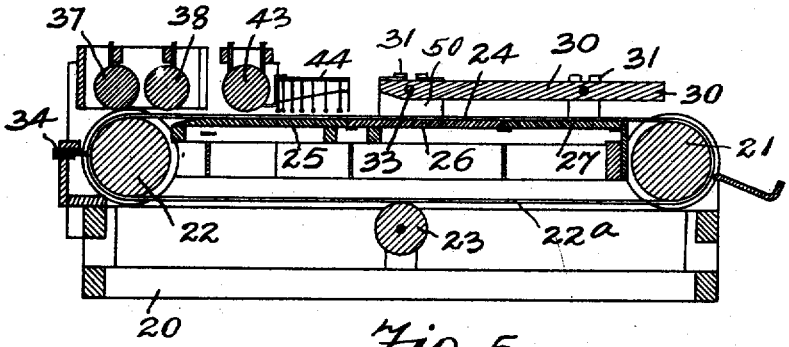
Figure 5 is a vertical longitudinal section through the machine.
Figure 6:
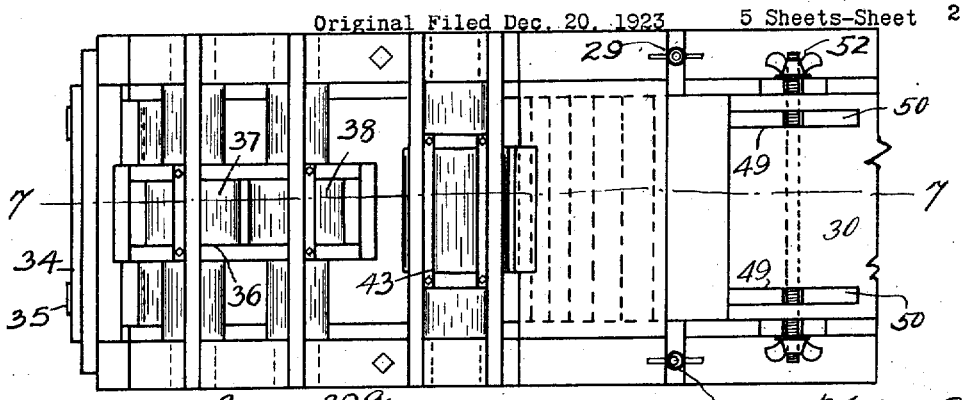
Figure 6 is a plan view of a portion of the machine showing the parts on an enlarged scale.

Journaled to revolve in the frame 20 are front and rear rollers 21 and 22 which may be driven in any suitable well known manner. An endless carrier belt 22ª passes over these rollers, and, as shown in Figure 5, this belt is formed from one piece of seamless material. The lower lead of the belt is supported by an idle roll 23. The upper lead of said belt freely extends over a lower mold surface or board 24, the latter consisting of sections 25, 26 and 27. These sections are mounted upon a vertically adjustable frame 28 having adjusting means 29 co-acting with the base frame 20. In order that the sections 26 and 27 can be independently adjusted with respect to the top lead of the belt 22ª for reasons to be hereinafter referred to, I connect the sections with said frame 20 by means of adjusting screws 29ª.

The section 25 is stationary so that it will move with the frame 20, adjustment of the latter being provided for through the screws 29 which work through a bracket plate 29ᵈ carried by said frame. The dough, when it leaves the rollers 37 and 38, is only partly flattened. All of the gas is not evacuated from the dough and additional pressure must be brought against the dough so as to finish the flattening operation and further evacuate the gas therefrom. I accordingly provide said screw means 29 which may be operated to move the fixed section 25 of the frame respectively toward and away from the flattening roller 43. If the dough is soft and tender, very slight pressure need be applied thereto to evacuate the gas therefrom. When the dough is stiff and tough, it is necessary that greater pressure be applied thereto, and in this instance the frame 20 is moved at the screws 29ª so as to decrease the size of the space between said roller 43 and said section 25.

The section 26 is loosely mounted on the frame 20 and can be independently adjusted in a vertical direction by its screw means 29ª. When the flattened mass of dough reaches a point midway between the sections 26 and 27, it is only partly molded, and the tightening up process, so to speak, begins at this point. Before the load finishes tightening up, I desire to bring enough pressure against the loaf to cause it to be drawn out to the desired length. If pressure is brought against the loaf at this point, the loaf will be satisfactorily lengthened in a manner that will not tear or break the skin of the dough. I accordingly provide for independent adjustment of said section 26.

When the board 54 is employed in the manufacture of pointed loaves, the mass of dough entering midway between the sections 26 and 27 is at the lowest point of the board 54 and same is only partly molded. By adjusting sections 26 and 27 upward toward said board 54, I bring same in such relatively close positions that will result in a satisfactory lengthening of the loaf, and I can make the ends of the loaf as pointed as desired. In this manner, I can control the shaping of the ends with great choice and accuracy, and same can be done with dispatch. By this independent adjustment of the two sections 26 and 27, various shapes and lengths will be given the finished loaf.

Superposed with respect to the board 26 is a top mold board or surface 30 (see Figure 5) removably and adjustably mounted in bearings 31 and associated with clamping means 33 whereby adjustments of the top board may be fixed with respect to said lower board. The rear end of the top board overhangs the roller 21, while the opposite end thereof terminates medially of said lower board.

Mounted in the main frame 20 is a dust box 23 open at its side toward the roller 22 so that flour may be automatically brought against the belt 22ª as the latter functions to advance its top lead over said board 26. A scraper blade 34 co-acts with roller 22 to remove the surplus flour from the belt. This blade is yieldingly advanced against the belt as it moves over the said roller 22, and toward this end I find it expedient to join said blades to a leaf spring 35 mounted on said frame 20.

Superposed with respect to the roller 22 is a hopper 36 and co-acting therewith are mating dough-flattening rolls 37 and 38 which act to pull a batch of dough therebetween; evacuate the gas therefrom, and finally deposit the flattened strip upon said carrier belt. These rolls are mounted to be positively driven and same extend into dust boxes 39 wherein scraper blades 40 and 41 are included and adapted to co-act with said rolls to keep same free from particles of dough and permit the intended mass of dough to work past the rolls without interference.

In front of the rolls 37 and 38 is a spice or oil hopper 42 and co-acting therewith is a single flattening roll 43, the latter disposed directly over the section 25 of the bottom mold board 26.

Figure 7:
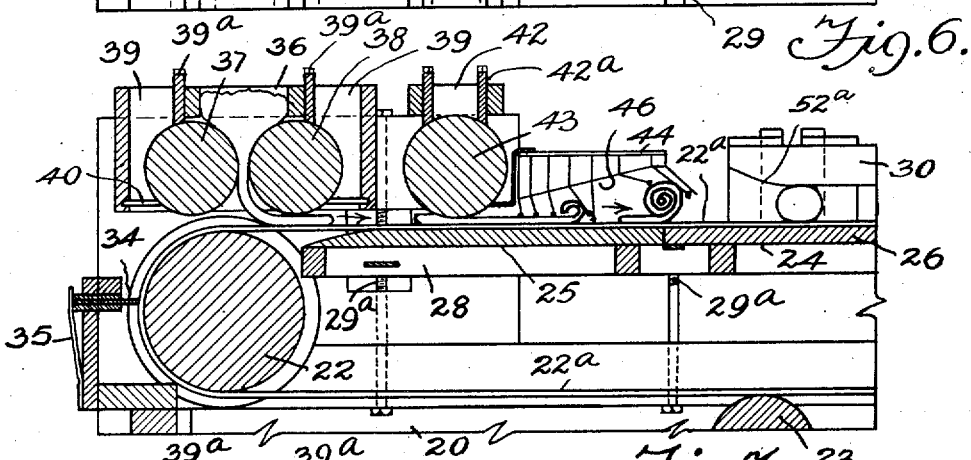
Figure 7 is a longitudinal section taken on line 7—7 of Figure 6.
Figure 9:
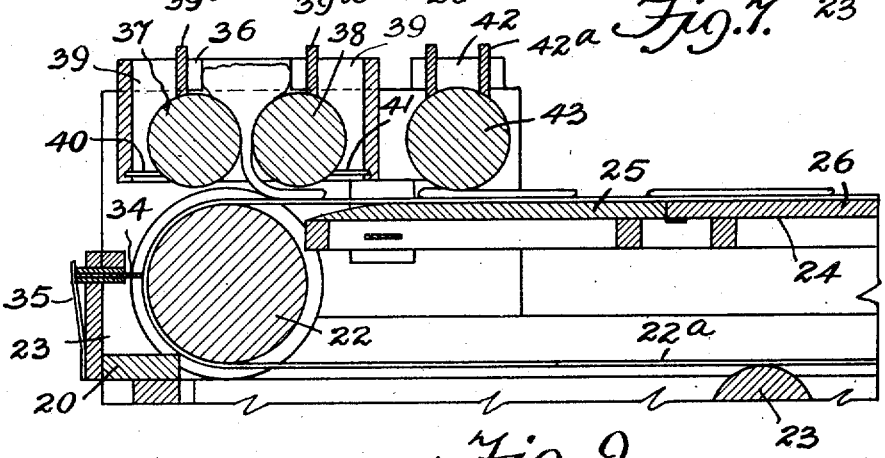
Figure 9 is a section on an enlarged scale through the dough flattening, dusting and spicing or oiling means.

Interposed between the roll 43 and the inner end of the top mold board 30 is a dough coiling mechanism 44, the latter being removably supported upon the main frame 20. This mechanism comprises a head 45 having a face 46 which is inclined upward toward the adjacent end of the board 30. Hung from this face 46 are hinge elements or knockers 47 of graduated lengths with respect to said face. All of these elements extend for the same distance toward the upper lead of the carrier belt and secured in each of said elements at its lower edge is a weight or suitable heavy rod or the like 48. The front end of said head 45 is provided with a scraper blade 48ª which bears against the roll 43, as shown in Figure 7. These hinge elements may be formed of any suitable well known material and in practice I have found canvas very appropriate for this purpose.

On reference to Figure 7 of the drawings, it will be observed that the said knockers 47, aside from being arranged in a straight row, are so spaced apart with respect to each other that when the dough is brought to engage with one knocker, the latter will swing in the direction of the next succeeding knocker, whereby the dough is made to accept the combined effect of a plurality of knockers. This causes a highly satisfactory compacting of the dough and insures a positive and uniform coiling thereof at all times. While the said knockers operate progressively or successively, they do not always function singly against the dough. For example, when the dough first enters the coiling mechanism, it comes against the first knocker that resides in its path. But, as the dough moves toward the discharge end of the mechanism, it causes one knocker to press against the next adjacent one, lifting the same, so to speak, and thereby, due to its close relationship to the said next adjacent knocker, the latter and the former are moved together and their combined weights are applied at the same time to the dough. In this manner, I provide a simple and positively acting means for progressively augmenting the compacting weight from the time the dough enters the coiling mechanism until the time of its exit therefrom.

Figure 8:
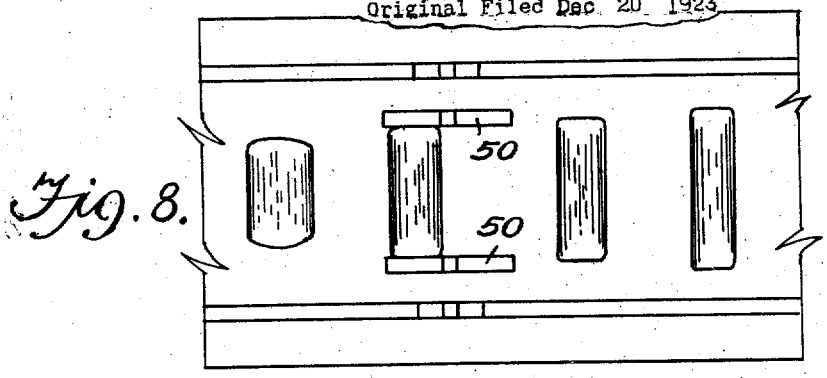
Figure 8 is a plan diagrammatic view of certain of the mold elements the top moldboard being removed.
Figure 12:
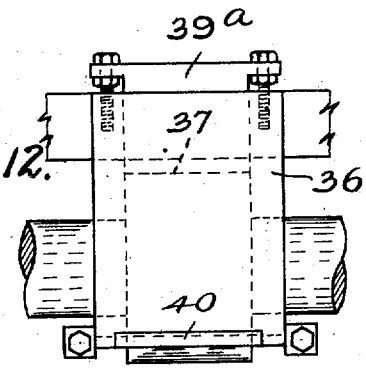
Figure 12 is a view in elevation of the dusting box and one of its rolls.
Figure 13:
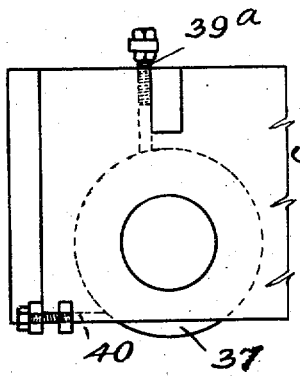
Figure 13 is an end view thereof.

The top mold board 30 is formed with parallel slots 49 and fitting therein are removable dough condensing walls or members 50—50. These members have yieldable boxes 51 which co-act with the clamp means 52 to hold the lower edges of said members against the carrier belt 22ª. By yieldingly pressing the members 50—50 against the belt 22ª, it is appreciated that they compensate themselves to adjustments of the respective mold boards. These members mutually define a runway for the dough to accommodate passage thereof as it leaves the coiling mechanism, and when the coiled mass of dough is brought to bear against the inner surfaces of said members the function of said surfaces is to constrict and press the mass in a longitudinal direction and flatten the ends thereof, as clearly shown in Figure 8. The under surface of the board 30 is flared at 52ª so that the runway formed by said members 50—50 is provided with an intake throat of a gradually increasing depth toward the highest point of the flare of said face 46 of the head 45. This allows the throat to properly compensate itself to the maximum diameter of the coiled mass of dough as the latter leaves the coiling mechanism 44. It will be seen that due to the formation of the head of said coiling mechanism and the flexible hinge elements thereof, the coil of dough progressively increases in diameter as it moves to the discharge end of said mechanism.

The mold board 30, Figures 2, 5, 7 and 14, is formed with a flat working face 53, the purpose of which I will explain hereinafter.

Figure 15:
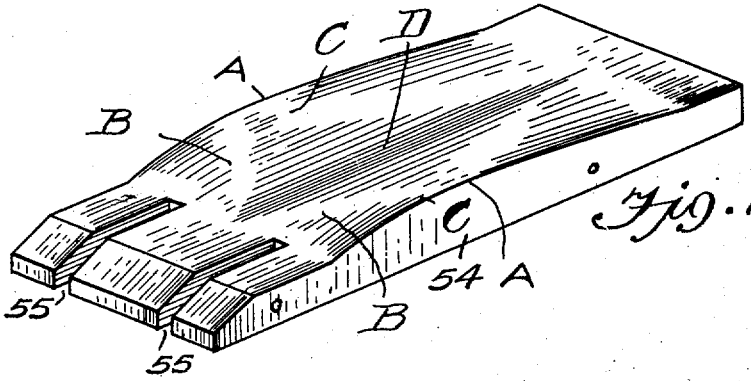
Figure 15 is an inverted perspective view of another form of top molding boards.
Figure 11:
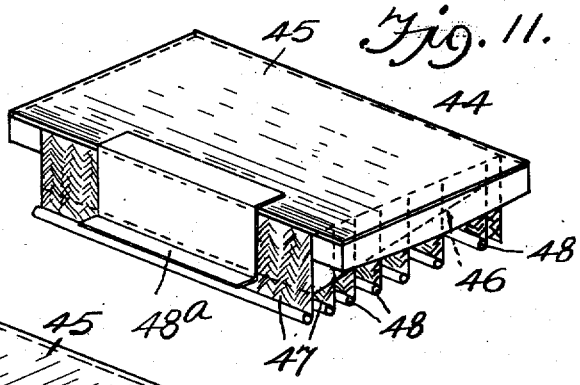
Figure 11 is a perspective view of the coiling mechanism.
Figure 16:
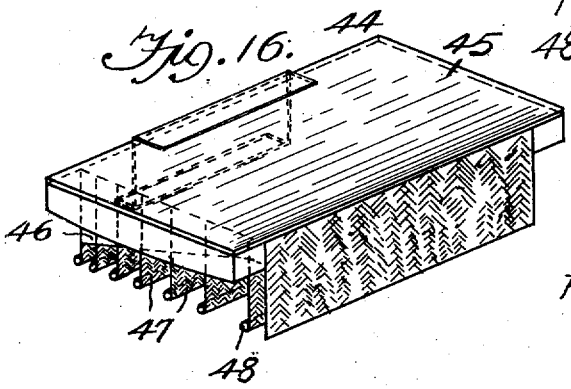
Figure 16 is a perspective view of the coiling mechanism looking at its opposite end to that shown in Figure 11.
Figure 17:
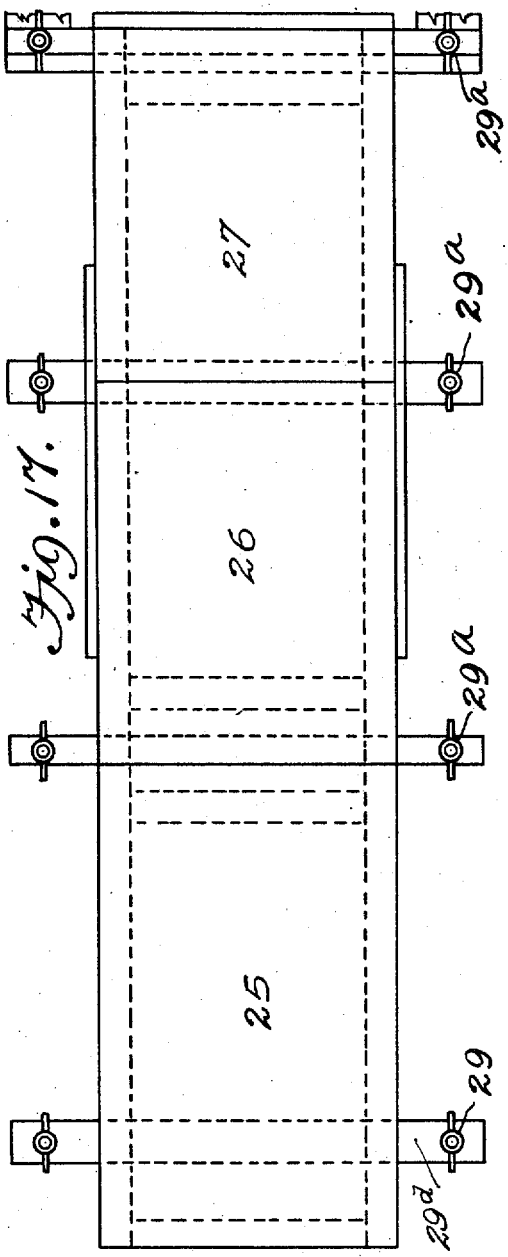
Figure 17 is a plan view of the lower molding board and its supporting frame.
Figure 18:
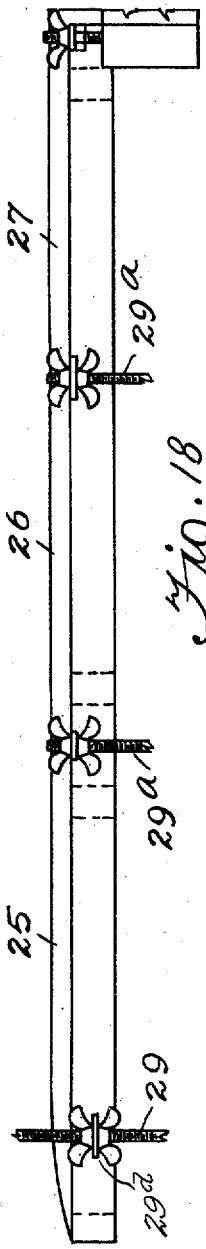
Figure 18 is a side view thereof.

In Figure 15 I show a second form of mold board 54, the same having parallel slots 55—55 to accommodate the members 50—50 as before described. Inwardly of these slots the under surface is formed respectively with longitudinal and transverse faces A—A and B—B, the latter being of a reduced thickness toward the longitudinal medial line of the board 54 and the former of a gradually increasing thickness from the respective ends of said faces so that the crest of each face is at C. This arrangement of faces A—A and B—B is in duplicate and one series of faces co-acts with the other of the series so that the center of the board defines a V-shaped molding trough D. In view of this order of the parts, it follows that as the dough rolls under the board, it is made to take a form which is thicker at its center than at any other part of the mass, and that the latter is provided with pointed ends.

Having described the essential features which characterize my invention, its operation will be described as follows: It shall be first assumed that in lieu of the board 30 in Figures 5 and 7, I employ the board shown in Figure 15. The dough carrier belt is moving in an effective conveying direction as shown by the arrow in Figure 7. A mass of dough of given weight is then inserted in the hopper 36, where it will be pulled downward between the rolls 37 and 38 and uniformly flattened and deposited upon the belt. It now proceeds under the roll 43 in order that it can be either supplied with oil or spice as desired, and the dough further flattened. As stated, the coiling mechanism 44 is located directly in advance of the roll 43, and as shown, the hinge element 47 of shorter effective coiling length is disposed immediately next to this roll where it initially serves to tap or knock the front end of the dough strip to start the formation of the desired coil. The remaining elements of this coiling mechanism function in progression with each other and the flare of the under side of the head 45 properly compensates itself to the gradually increasing thickness of the rolled dough. As the coiled dough emerges from the coiling mechanism it passes between the board 54, Figure 15, where it is first taken up or condensed in its length by action of the parallel members 50—50. It then continues to move onto or against the effective mold or deforming faces of said board. As may depend upon the positions of adjustments of the upper and lower mold boards, it is manifest that a mass of dough can be attenuated to the extent desired and that it may be made to assume a previously calculated thickness. This may be best understood upon reference to the series of shapes shown at E in Figure 19.

When it is desired to form square end loaves or rolls, I employ the board 30 and members 50—50. These boards may be adjusted relatively to suit the requirements and permit respectively graduated-cylindrical-straight ended masses to be formed as shown at F, Figure 19. In either of the instances just referred to, I employ the coiling mechanism 44.

When making "Parker-house" rolls or the like wherein but one turn is given the flattened mass of dough, I remove the top board of the machine and feed the dough into the hopper 36 as before and permit it to pass under the oiling or spicing roll 43. I remove the coiling mechanism 44 and as the flattened strip of oiled or spiced dough emerges from said roll 43, it is caught by the hands of the operator and folded on itself as shown at G, Figure 19. In this case, the section 25 of the lower mold board may be adjusted in the desired relation to the roll 43 to regulate the thickness and width of the rolled dough.

Figure 19:
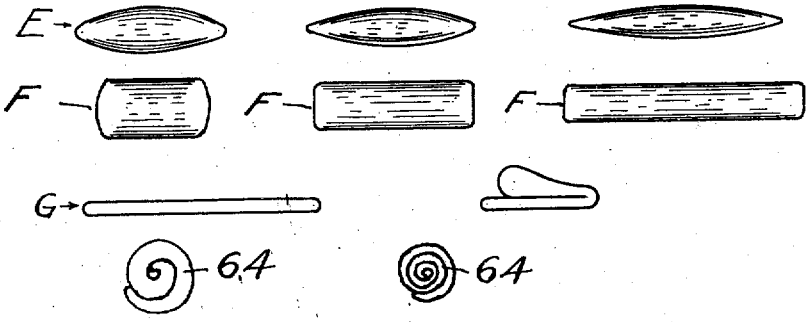
Figure 19 is a diagrammatic illustration of a number of forms of rolls and loaves that can be rolled by my machine.
Figure 10:
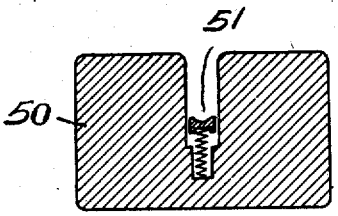
Figure 10 is a section on the line 10—10 of Figure 1.
Figure 14:
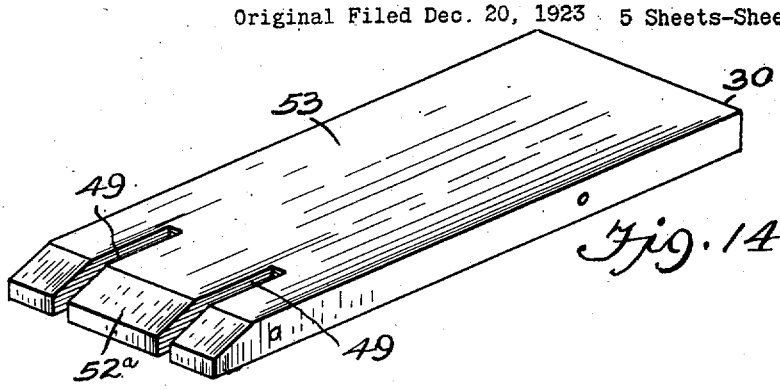
Figure 14 is a perspective view of one of the top molding boards.

In making certain pastries or the like, wherein it is simply desired to form coils as shown at 64, Figure 19, I employ the coiling mechanism 44, but omit the top molding board 30 or 45.

In order that the discharge of flour from the dust boxes 39—39 can be regulated to suit the requirements, I provide same with regulating gates 39ª. The box 42 is provided with similar gates 42ª.

I claim:

1. In a dough handling machine a pair of relatively adjustable mold surfaces, a conveyor for moving a batch of dough between said surfaces, means for rolling the dough as it approaches said surfaces, and removably mounted means for coiling the rolled dough before entrance thereof between said surfaces, said coiling means being independent of the mold surfaces and having normally vertical depending ductile curtains closely related at their lower edges to said conveyor.

2. In mechanism of the class described, means for coiling a flat strip of dough, comprising a series of flexible depending baffles of respectively graduated lengths with respect to a fixed surface, said baffles having continuous weights extending entirely along their free lower edges, the weights of the respective baffles arranged in the same general plane with each other and means to permit a strip of dough to successively pass from one of said baffles to another and to be knocked thereby to wind the strip in helicoidal form.

3. In mechanism of the class described, means for coiling a flat strip of dough comprising a series of flexible baffles arranged in row formation and in spaced relation, each of said baffles formed of ductile material and having its extreme lower edge provided with a continuous weight and means to cause a flat strip of dough to pass in the presence of said baffles and to successively contact therewith, and thereby cause said strip to be rolled on itself.

4. Mechanism of the class described comprising a belt, means having an inclined surface arranged over said belt, and a series of depending curtains extending from said surface toward said belt, each of said curtains having a continuous weight forming bar extending along its extreme lower edge the belt acting to advance a strip of dough beneath said curtains and thereby cause successive engagement of said curtains with the dough to roll same in coil form.

5. In a dough handling machine, a frame, a conveyor carried by said frame, a mold board underlying one lead of the conveyor and adjustable thereagainst, a mold board separable from the frame and normally supported above the first said mold board, and with one lead of the conveyor interposed between the two boards, a pair of co-acting rolls at one end of the conveyor, said rolls serving to permit a mass of dough to move therethrough in impinging relation thereto so as to initially flatten the dough and cause a part of the gas contained therein to be evacuated therefrom, and a single roll located in advance of the coacting rolls and adapted to coact with said underlying mold board to finish the dough flattening operation and further evacuate gas from the dough, and means for adjusting the underlying board with respect to said single roll.

6. In a dough handling machine, a frame, a conveyor carried by said frame, a mold board underlying one lead of the conveyor and adjustable thereagainst, a mold board separable from the frame and normally supported above the first said mold board, and with one lead of the conveyor interposed between the two boards, a pair of coacting rolls at one end of the conveyor, said rolls serving to permit a mass of dough to move therethrough in impinging relation thereto so as to initially flatten the dough and cause a part of the gas contained therein to be evacuated therefrom, a single roll located in advance of the coacting rolls and adapted to coact with said underlying mold board to finish the dough flattening operation and further evacuate the gas from the dough, means for adjusting the underlying board with respect to said single roll, and coiling means having ductile curtains depending toward said underlying board, the respective curtains of said coiling means having their extreme lower edges provided with continuous weights, said lower edges being in normal horizontal alinement relatively.

7. In a dough handling machine, a frame, a conveyor carried by said frame, a mold board underlying one lead of the conveyor and adjustable thereagainst, a mold board separable from the frame and normally supported above the first said mold board, and with one lead of the conveyor interposed between the two boards, a pair of coacting rolls at one end of the conveyor, said rolls serving to permit a mass of dough to move therethrough in impinging relation thereto so as to initially flatten the dough and cause a part of the gas contained therein to be evacuated therefrom, a single roll located in advance of the coacting rolls and adapted to coact with said underlying mold board to finish the dough flattening operation and further evacuate gas from the dough, means for adjusting the underlying board with respect to said single roll, and a pair of spaced apart relatively parallel members carried by the first said mold board and yieldingly bearing against said one lead of the belt and adapted to constrict the length of the dough before subsequently subjecting the dough to the action of both mold boards at points rearwardly of said members.

8. A machine of the class described including an endless conveyor, a vertically adjustable frame having a mold board consisting of a fixed section movable with the frame and a plurality of independently adjustable sections adapted to be moved when the frame is stationary, said frame underlying the top lead of the conveyor, a second mold board overlying the top lead of the conveyor in coaction with the first said mold board, a pair of coacting rolls at one end of the conveyor for flattening a mass of dough and advancing same on to said conveyor, and a roll overlying the fixed section of the first mold board, all of said rolls and said fixed section mutually functioning to successively cause evacuation of gas from the dough as the latter is progressively advanced by said conveyor.

9. A machine of the class described comprising a conveyor belt, a hopper at one end of the belt, a pair of coacting dough flattening and gas evacuating rolls in said hopper, means for dusting the rolls, means for scraping the rolls in advance of the dusting means, a hopper at one side of the first said hopper, a flattening and gas evacuating roll in said second hopper, means for elevating the belt against said second named roll, said adjusting means comprising a mold board underlying the top lead of the belt and consisting of a series of sections, means for independently adjusting certain of the sections against the top lead of the belt, and means for adjusting another of the sections so as to vary the size of the space between the top lead of the belt and the last named gas evacuating and dough flattening roll.

10. A dough handling machine comprising an endless conveyor, a pair of dough flattening and gas evacuating rolls for acting on a mass of dough and delivering same in flat form to the conveyor, a second roll disposed in advance of the first said rolls, means for bringing the top lead of the belt into impingement with a mass of dough passing under said second named roll, and a coiling mechanism located immediately in advance of said second named roll and provided with a series of parallel ductible curtains whose lower edges are arranged in the same general plane and positioned adjacent to the top lead of the conveyor.

11. In a dough molding machine, shaping means including a pair of superposed spaced apart mold boards, dough flattening means, coiling mechanism between the flattening means and the adjacent end of the top board, a conveyer co-acting with both boards of the shaping means and with the flattening means and the said coiling means, so that dough acted upon by the flattening means will be progressively moved to the coiling means, thence to the space between the two mold boards, the top mold board having its under surface flared upwardly in the direction of the coiling means and the said coiling means embodying a longitudinal series of spaced apart tilting curtains of respectively increasing lengths toward the flared surface of the said top mold board.

12. In a dough molding machine, shaping means including a pair of superposed spaced apart vertically adjustable mold boards, dough flattening means, coiling mechanism between the flattening means and the adjacent end of the top board, a conveyer co-acting with both boards of the shaping means and with the flattening means and the said coiling means, so that dough acted upon by the flattening means will be progressively moved to the coiling means, thence to the space between the two mold boards, the top mold board having its under surface flared upwardly at one end in the direction of the coiling means and the said coiling means embodying a longitudinal series of spaced apart tilting curtains of respectively increasing length toward the flared surface of the said top mold board, and means for adjusting the mold boards relatively to vary the pressure thereof against the dough.

FRANK A. SCRUGGS.